(12) United States Patent
Nielsen

(10) Patent No.: US 7,738,473 B2
(45) Date of Patent: Jun. 15, 2010

(54) MULTICAST SWITCHING IN A CREDIT BASED UNICAST AND MULTICAST SWITCHING ARCHITECTURE

(75) Inventor: Jacob V. Nielsen, Virum (DK)

(73) Assignee: Forestay Research, LLC, Denver, CO (US)

( * ) Notice: Subject to any disclaimer, the term of this patent is extended or adjusted under 35 U.S.C. 154(b) by 634 days.

(21) Appl. No.: 11/407,038

(22) Filed: Apr. 20, 2006

(65) Prior Publication Data

US 2007/0248082 A1    Oct. 25, 2007

(51) Int. Cl.
*H04L 12/28* (2006.01)
(52) U.S. Cl. .................. 370/413; 370/417; 370/418
(58) Field of Classification Search ............... 370/413
See application file for complete search history.

(56) References Cited

U.S. PATENT DOCUMENTS

| | | | |
|---|---|---|---|
| 5,703,875 | A | 12/1997 | Burnett |
| 6,049,546 | A | 4/2000 | Ramakrishnan |
| 7,292,594 | B2 * | 11/2007 | Meempat et al. ............ 370/413 |
| 2001/0021174 | A1 * | 9/2001 | Luijten et al. ............... 370/229 |
| 2003/0103501 | A1 | 6/2003 | Clem et al. |
| 2003/0174701 | A1 * | 9/2003 | Angle et al. ................ 370/390 |
| 2003/0231588 | A1 * | 12/2003 | Roth et al. .................. 370/230 |
| 2006/0018329 | A1 | 1/2006 | Nielsen et al. |
| 2006/0050740 | A1 * | 3/2006 | Hsu et al. ................... 370/477 |
| 2006/0256723 | A1 * | 11/2006 | Hellenthal ................. 370/235 |
| 2007/0195778 | A1 * | 8/2007 | Tatar et al. ................. 370/392 |

FOREIGN PATENT DOCUMENTS

EP        1 052 815 A2    11/2000

OTHER PUBLICATIONS

RFC2698 (RFC 2698, A Two Rate Three Color Marker, Sep. 1999).*
U.S. Appl. No. 11/187,236, filed Jul. 22, 2005, Nielsen.

* cited by examiner

*Primary Examiner*—Daniel J. Ryman
*Assistant Examiner*—John Blanton
(74) *Attorney, Agent, or Firm*—SoCal IP Law Group LLP; Steven C. Sereboff; John E. Gunther

(57) ABSTRACT

A system and method of switching packets and/or cells, which includes a switching apparatus having a plurality of input units that receive at least one packet to be transferred by the switching apparatus. A plurality of output units transfer the packet out of the switching apparatus. A switch unit transfers the packet from one of the input units to one of the output units. Each input unit includes at least one input queue that temporarily holds the packet to be transferred by the switching apparatus. Each input unit also includes a respective unicast credit count unit that allows the packet to be transferred out from the queue when a current unicast credit value determined by the unicast credit count unit is at least predetermined value. Each output unit includes at least one output queue that receives the packet as switched by the switch unit, and which is to be transferred out of the switching apparatus. Each output unit also includes a output port scheduler unit that generates credit tokens and that outputs credit messages based on the credit tokens generated. Multicast credit count units are provided for each QoS priority that a multicast packet can be set to, in which they maintain a current multicast credit value for the QoS priorities.

12 Claims, 5 Drawing Sheets

MULTICAST SWITCHING IN A CREDIT BASED UNICAST AND MULTICAST SWITCHING ARCHITECTURE

BACKGROUND OF THE INVENTION

A. Field of the Invention

The invention relates generally to scheduling of unicast and multicast packets and cells, and, more particularly, to a packet and cell switching apparatus where the output units schedule unicast and multicast traffic via a credit mechanism, and where the switch unit schedules multicast traffic at a fabric scheduling stage, and where unicast and multicast traffic is merged on a per output port basis via a credit mechanism.

B. Description of the Related Art

A generic packet switching apparatus can be partitioned into the following three units: the input unit, the switch unit, and the output unit. As a packet traverses the switching apparatus from an input port to an output port, it passes these units in the listed order of sequence.

The majority of the switching apparatus' buffer capacity is typically implemented at the input unit. The input buffering typically includes Virtual Output Queue (VoQ) structures. In addition to the buffering performed by the input unit, the switch unit may also implement buffering, and the output unit may also implement buffering, depending on the implementation.

Any scheduling process can be viewed as two stages of scheduling. One stage, called "traffic scheduling", determines the order and sequence in which the incoming packets are transferred from the input to the output port of the switching apparatus. The second stage, called "fabric scheduling", is the level of scheduling which performs the transfer of the packets from the input to output units. In conventional cell and/or packet switching systems, both the traffic scheduling and fabric scheduling are performed by the switch unit. There is a desire to have some of those scheduling processes decentralized from the switch unit, in order to lessen the burden on that component and to distribute it to other components of a switching apparatus that have resources available to perform those processes.

SUMMARY OF THE INVENTION

At least one aspect of the present invention performs multicast switching in a credit based unicast and multicast switching architecture.

According to one aspect of the invention, there is provided a switching apparatus, which includes a plurality of input units each configured to receive at least one packet to be transferred by the switching apparatus. The switching apparatus also includes a plurality of output units each configured to transfer the at least one packet out of the switching apparatus. The switching apparatus further includes a switch unit configured to transfer the at least one packet from a respective one of the input units to a respective one of the output units. Each of the input units includes at least one input queue configured to temporarily hold the at least one packet to be transferred by the switching apparatus. Each of the input units also includes at least one unicast credit count unit configured to allow the at least one packet to be transferred out from the at least one queue when a current unicast credit value determined by the unicast credit count unit is at least predetermined value, the at least one unicast credit count unit configured to receive a unicast credit value provided thereto, wherein there is one unicast credit count unit per input queue.

Each of the output units includes at least one output queue configured to receive the at least one packet as switched by the switch unit, and which are to be transferred out of the switching apparatus. Each of the output units also includes an output port scheduler unit configured to generate credit tokens and to output the credit message based on the credit tokens generated. A plurality of multicast credit count units is provided for each of a plurality of QoS priorities that a multicast packet is capable of being set to, the plurality of multicast credit count units respectively configured to maintain a current multicast credit value for the plurality of QoS priorities, the plurality of multicast credit count units configured to allow the at least one packet to be transferred out from the respective one of the plurality of output queues when a current multicast credit value determined by the respective one of the plurality of multicast credit count units is at least a second predetermined value.

According to another aspect of the invention, there is provided a method for a switching apparatus that includes a plurality of input units each configured to receive packets to be transferred by the switching apparatus, a plurality of output units each configured to transfer the packets out of the switching apparatus, and a switch unit configured to transfer the packets from respective ones of the input units to respective ones of the output units. The method includes receiving, by an input queue of one of the input units, at least one packet to be transferred by the switching apparatus. The method also includes determining a current unicast credit value for the input queue. Based on the determined current unicast credit value, the method includes determining if the input queue is in a Hungry state. If the Hungry state has changed from a previous determination of the Hungry state, the method includes outputting a unicast queue status message from the one of the input units. The method further includes determining, by one of the output units, the queue status for the input queue of the one of the input units. Based on the unicast queue status message, the method further includes determining if the at least one packet currently stored in the input queue of the one of the input units is eligible for transfer from the input unit to the switch unit. If the at least one packet currently stored in the input queue of the one of the input units is determined to be eligible for transfer, the method includes outputting a credit message to the input queue of the one of the input units.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Compared to conventional switching apparatus where unicast and multicast traffic are scheduled by a switch unit, the present invention provides a method and system where traffic scheduling of unicast traffic is de-centralized away from the switch unit by being partially distributed to the output units, and where the output unit merges and co-schedules unicast and multicast traffic on a per output port basis via a credit distribution mechanism.

Several conventional examples of switch unit implementations exist, whereby the switch unit implementations are outside the scope of the present invention. The present invention addresses a scalability problem which is in general associated with switch unit implementations, whereby the switch unit implementation becomes increasingly complex as the number of ports and QoS priorities provided by the switch unit increases. As a result, the switch unit becomes an implementation bottleneck for scaling the capacity of switching apparatus implementations. The present invention allows for scaling the number of output ports and QoS priorities provided per output unit without increasing the required complexity of the switch unit implementation.

In the present invention, the credit scheduling referred to below is scheduling that occurs at the "traffic scheduling" stage, whereby the fabric scheduling is beyond the scope of this invention, and may be performed by conventional methods. That is, once a unicast packet or cell has been qualified for transfer from an input to an output unit by way of the credit mechanism or credit scheme as discussed in detail below, that same packet or cell then undergoes fabric scheduling, whereby the fabric scheduling is typically performed by a switch unit. The traffic scheduling stage determines when a unicast packet or cell can be forwarded to the fabric scheduling (whereby the fabric scheduling is performed by DataTx units referred to in detail below). Thus, unless identified otherwise, the credit-based scheduling described below is performed at the traffic scheduling stage.

Figure 1:
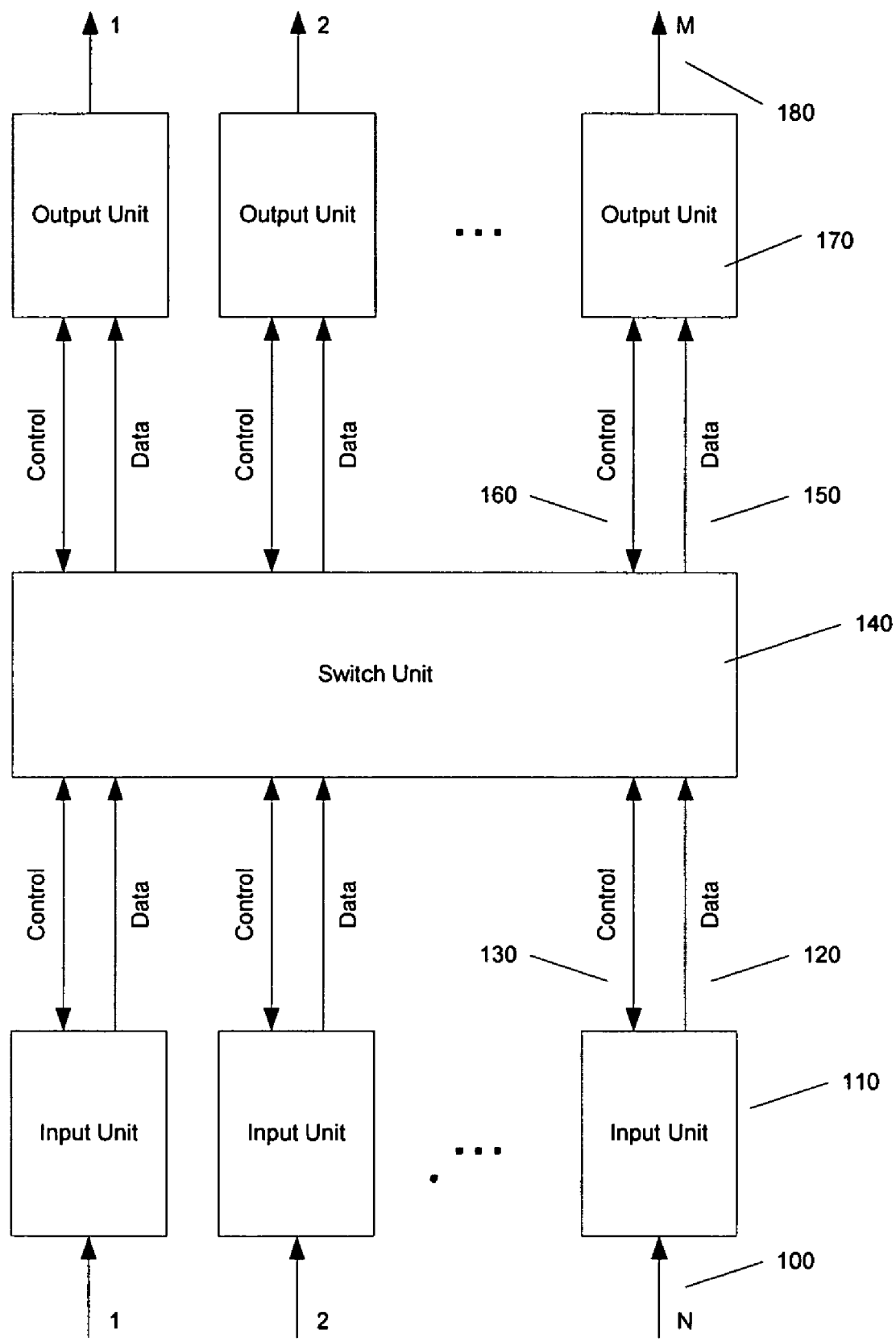
FIG. 1 shows a switching apparatus according to a first embodiment of the invention.

FIG. 1 shows an N×M switching apparatus (N and M are integer values) incorporating a packet scheduling method and apparatus according to a first embodiment of the present invention. Each of the N input ports 100 receives packets, and buffers the received packets in their respective input units 110. Each input unit 110 transmits packets to the switch unit 140 via the ingress data links 120. The switch unit 140 transmits the packets to their destination output unit via the egress data links 150. The packets exit the switching apparatus via the N output ports 180 associated with the output units 170.

The input unit 110 performs a bi-directional exchange of internally generated control messages with the output units 170. This message exchange is performed via the input unit's control link 130 and the output unit's control link 160, across the switch unit 140. In one possible implementation of the first embodiment, input unit L and output unit L (L being a positive integer greater than one) are integrated into a single physical device. This way, the L'th input unit 110 and the L'th output unit 170 can share the same bi-directional control link connecting to the switch unit 140, which reduces the number of control links in half.

The switch unit 140 transmits unicast packets from the input unit 110 to the unicast packet's destination output unit 170, and the switch unit 140 replicates and transmits a copy of a multicast packet from the input units 110 to each of the multicast packets destination output units 170.

In the first embodiment, the switch unit 140 has the capability of prioritizing between packets accordingly to unicast and multicast QoS priorities. Depending on the implementation of the switch unit 140, each individual multicast packet is transmitted one or multiple times from an input unit 110 to the switch unit 140, until the switch unit 140 has transmitted a copy of the multicast packet to each of the multicast packets destination output units 170.

The implementation of the switch unit 140 for performing fabric scheduling is outside the scope of this invention, whereby well known implementation approaches include scheduled crossbar switches, shared memory buffer switches, and buffered crosspoint switches, implemented in a single or multi-stage switch topologies. A typical switch unit implementation includes a single device unit in smaller switching apparatus implementations, while multiple device units are typically used in larger switching apparatus implementations.

Figure 2:
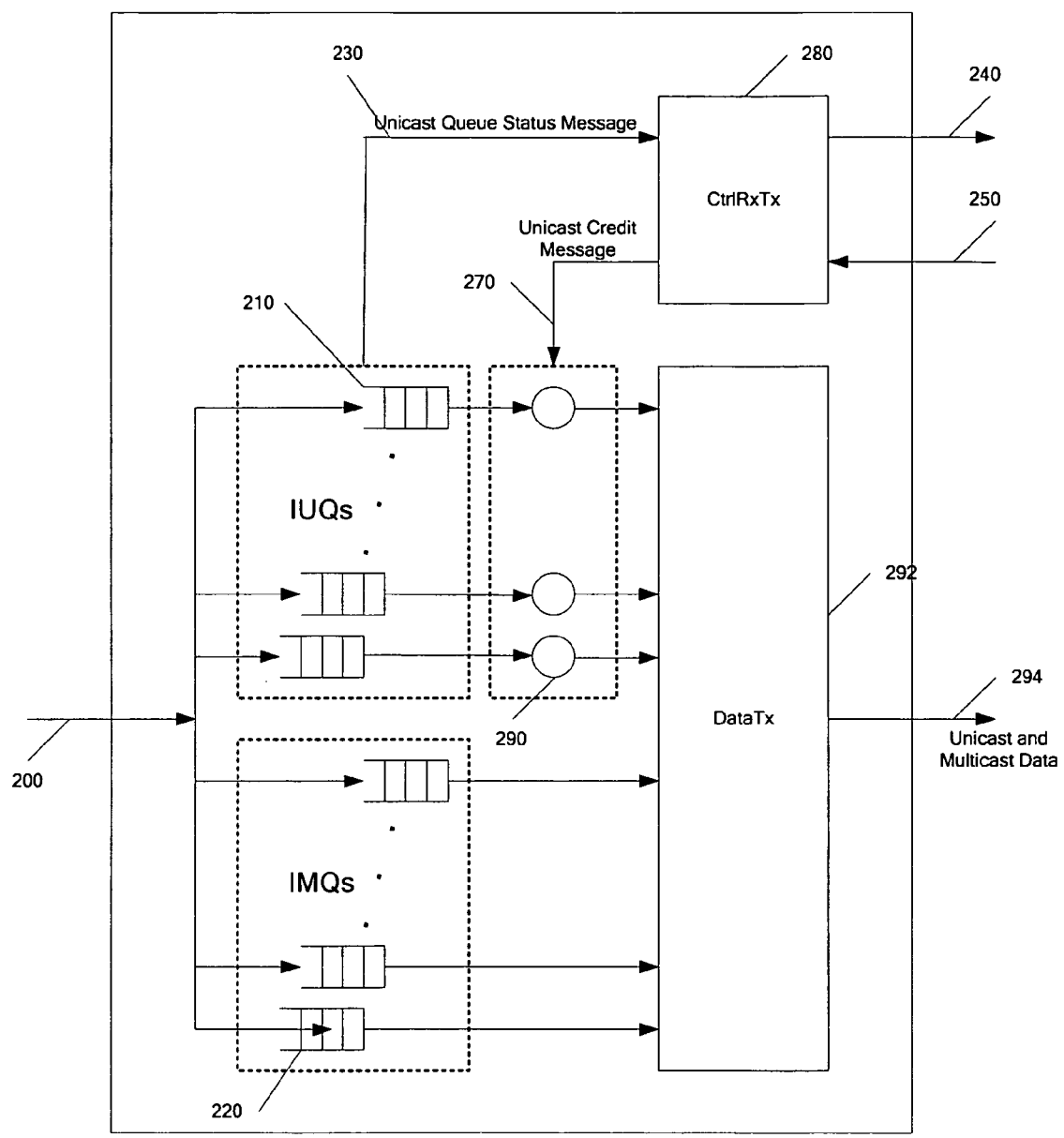
FIG. 2 shows an input unit of the switching apparatus according to the first embodiment.

FIG. 2 shows the details of an input unit 110 that may be utilized in the first embodiment. Incoming unicast and multicast packets arrive at the input port 200 of the input unit 110. If the arriving packet is a multicast packet, it is buffered in one of the Input Multicast Queue (IMQ) 220, where each IMQ 220 represents a multicast QoS priority. It is the multicast packet's QoS priority which determines in which IMQ 220 the multicast packet is buffered.

The DataTx unit 292 interfaces between the IMQs 220 and the ingress data link 294 which connects the input unit 110 to the switch unit 140. It is the DataTx unit 292 which controls when multicast packets are forwarded from the IMQs 220 to the switch unit 140. The implementation of the switch unit 140 and the associated DataTx unit 292 in the input unit 110 for performing fabric scheduling is outside the scope of this invention, and may be performed by conventional fabric scheduling techniques. In a typical implementation, the forwarding of multicast packets is controlled by a multicast scheduling mechanism provided by the switch unit 140, and/or by a multicast scheduling mechanism provided by the input unit 110, and/or by a multicast flow control backpressure mechanism between the switch unit 140 and the input unit 110.

If the incoming packet is a unicast packet, it is buffered in one of the Input Unicast Queues (IUQ) 210, where each IUQ 210 represents a distinct <output port, unicast QoS priority> combination. It is the unicast packet's destination output port and unicast QoS priority which determines in which IUQ 210 the unicast packet is buffered.

The DataTx unit 292 interfaces between the IUQs 210 and the ingress data link 294 which connect the input unit 110 to the switch unit 140, in a fabric scheduling stage. It is the DataTx unit 292 which controls when unicast packets are forwarded from the IUQs to the switch unit 140. The implementation of the switch unit 140 and the associated DataTx unit 292 in the input unit 110 for performing fabric scheduling is outside the scope of this invention, and may be performed by conventional fabric switching techniques. In a typical implementation, the forwarding of unicast packets is controlled by a unicast scheduling mechanism provided by the switch unit 140, and/or by a unicast scheduling mechanism provided by the input unit 110, and/or by a unicast flow control backpressure mechanism between the switch unit 140 and the input unit 110.

Before a unicast packet can be forwarded from the IUQ 210 to the DataTx unit 292, it is qualified for forwarding as described in the following. A credit counter variable, UnicastCreditCnt 290, is maintained per IUQ 210. The counter maintains the IUQ's current number of credits, and the variable is defined the range given by:

UnicastCreditCnt $\in$ [−MTU to CreditMax]

Where,

MTU is the largest packet size supported by the switching apparatus (e.g., 128, 1500, 10000, or 16000 bytes)

CreditMax is a threshold at which the UnicastCreditCnt counter saturates. A typical value of UnicastCreditCnt is MTU.

The credit counter is updated such that,

UnicastCreditCnt=UnicastCreditCnt+CreditMsg−PacketSize, and has a default reset value of zero.

Where,
CreditMsg is the credit value carried in an incoming unicast credit message 270 destined for the associated IUQ 210. The addition of CreditMsg to UnicastCreditCnt is performed when the credit message arrives at the IUQ 210 via the incoming control link 250.
PacketSize is the size of a unicast packet which is moved from the IUQ 210 to the DataTx unit 292. The subtraction of PacketSize from UnicastCreditCnt is performed by adder/subtractors when the packet is forwarded from the associated IUQ 210 to the DataTx unit 292.

Before a unicast packet can be forwarded from an IUQ 210 to the DataTx unit 292, it is qualified for forwarding as determined by the value of the UnicastCreditCnt variable associated with the IUQ 210. The packets are qualified one-by-one for forwarding out of the IUQ 210. The packet currently located in the front of the queue is qualified for forwarding when UnicastCreditCnt is equal to or greater than zero (UnicastCreditCnt$\geq$0). When the UnicastCreditCnt holds a negative value, no packets can be qualified for forwarding from the IUQ 210 to the DataTx unit 292.

A UnicastHungry status (Boolean) is associated with each IUQ 210. The UnicastHungry status determines whether or not the IUQ 210 is requesting to be allocated and receive credits. When an IUQ's UnicastHungry status changes, information about the new status is forwarded as a unicast queue status message 230, which is transmitted from the input unit 110 to the output unit 170 associated with the IUQ 210, via the switch unit 140. The UnicastHungry status is defined as:

UnicastHungry=((NonEmpty) or (UnicastCreditCnt<0)) and (UnicastCreditCnt<CreditMax)

Where,
NonEmpty is a Boolean which is True (="1"), when one or more packets are stored in the associated IUQ 210.
UnicastCreditCnt is the credit counter associated with the IUQ 210 (see definition above)
CreditMax is defined above.

When the UnicastCreditCnt value is negative, the associated UnicastHungry status is True, which means that the IUQ 210 is eligible to receive credits. As credits arrive, the UnicastCreditCnt will eventually reach a value of zero or higher, which in turn will qualify the current packet in head-of-line position in the IUQ 210 to be forwarded, whenever the input unicast queue is non-empty.

In an alternative implementation of the first embodiment, the IUQ's head-of-line packet can be qualified for forwarding when UnicastCreditCnt is equal to or greater than the size of the head-of-line packet. In such an alternative implementation of the first embodiment, the UnicastCreditCnt variable holds a value of zero or higher.

The unicast queue status messages are generated based on the associated UnicastHungry status variables as described above, and it is the CtrlRxTx unit 280 which performs the transmission of the unicast queue status messages to the output unit via the outgoing control link 240 which connects the input unit 110 to the switch unit 140.

Credit messages which have been generated by the output units 170 and transmitted to the input unit 110, via the switch unit 140, are received by the CtrlRxTx unit 280 via the incoming control link 250. It is the CtrlRxTx unit 280 which performs the reception of credit messages, and directs the received credits to their destination IUQ 210 and associated UnicastCreditCnt variable.

The implementation of the switch unit 140 and the associated CtrlRxTx unit 280 in the input unit for performing fabric scheduling is outside the scope of this invention, and may be performed by conventional fabric scheduling techniques. In a typical implementation, the transmission and reception of the queue status and credit messages is controlled by a message scheduling mechanism provided by the switch unit 140, and/or by a message scheduling mechanism provided by the input unit 110, and/or by a message flow control backpressure mechanism between the switch unit 140 and the input unit 110.

Figure 3:
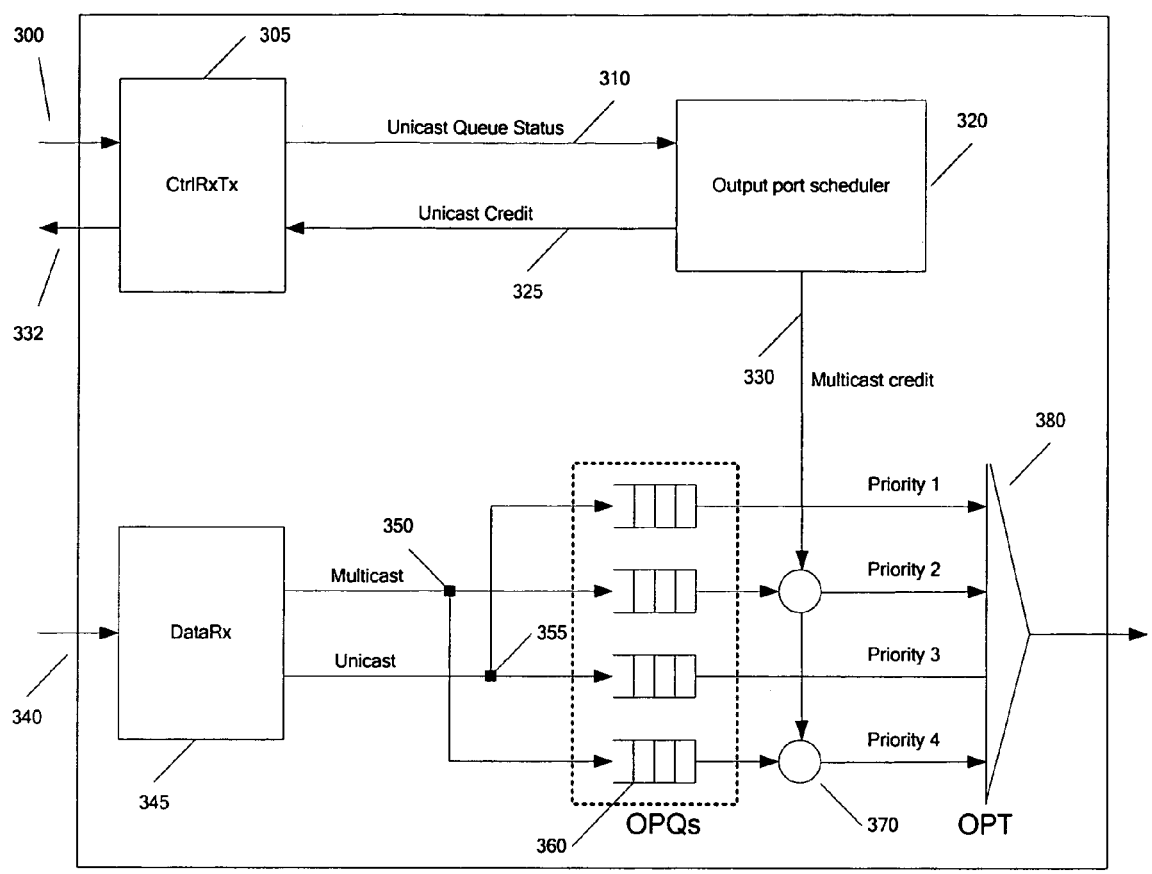
FIG. 3 shows an output unit of the switching apparatus according to the first embodiment.

FIG. 3 shows the details of an output unit 170. Unicast queue status messages which have been generated by the input units 110 and transmitted to the output unit 170, via the switch unit 140, are received by the CtrlRxTx unit 305 via the incoming control link 300. It is the CtrlRxTx unit 305 which performs the reception of unicast queue status messages, and forwards 310 the received queue status information to the output port scheduler unit 320.

Through the received unicast queue status messages, the output port scheduler unit 320 maintains the UnicastHungry status for every IUQ 210 in the switching apparatus which corresponds to the particular <output port, unicast QoS priority> combination. The queue status is updated whenever a unicast queue status message arrives, according to the queue status carried in the incoming unicast queue status message.

The output port scheduler unit 320 generates a stream of credit tokens, where the value of the credit tokens corresponds to the output ports maximum transmission rate. The following steps determines if the credit token results in the generation of a credit message, and if so, to which IUQ 210 or OPQ 360 the credit message is to be transmitted.

1. Wait for a credit token to become available for the output port.
2. Filter out the output ports unicast QoS priorities, for which the UnicastHungry status is False for all IUQs 210 corresponding to the output port unicast QoS priority.
3. Filter out the output ports multicast QoS priorities, for which the MulticastHungry status is False for the corresponding Output Port Queue (OPQ) 360 (see description of Output Port Queue (OPQ) 360 and associated MulticastHungry status below).
4. Select a unicast or multicast QoS priority between the remaining non-filtered unicast and multicast QoS priorities. The selection is performed according to the priority order between unicast and multicast QoS priorities. If all QoS priorities have been filtered out, discard the credit token and go to step 1.
5. If the selected QoS priority is a unicast QoS priority:
   a. Select round robin or weighted round robin between the input units, which have an IUQ 210 corresponding to the selected unicast QoS priority, for which the UnicastHungry status is True.
   b. Generate a unicast credit message, and forward it 325 to the CtrlRxTx unit 305.
   c. Transmit the credit message to the selected input unit which implements the IUQ 210 for which the credit message is destined (via a control link 332 and the switch unit).
   d. Go to step 1)
6. If the selected QoS priority is a multicast QoS priority:
   a. Generate a multicast credit message for the selected Multicast QoS priority.
   b. Forward the multicast credit message 330 to the MulticastCreditCnt variable 370 associated with the selected multicast QoS priority and corresponding Output Port Queue (see detailed description of Output Port Queue (OPQ) 360 and associated MulticastCreditCnt variable below).
   c. Go to step 1

The implementation of the CtrlRxTx unit 305 for performing fabric scheduling depends on the switch unit implementation which is outside the scope of this invention, and may be performed by conventional fabric scheduling techniques. In a typical implementation, the transmission and reception of the queue status and credit messages is controlled by a message scheduling mechanism provided by the switch unit 140, and/or by a message scheduling mechanism provided by the input unit 110, and/or by a message flow control backpressure mechanism between the switch unit 140 and the input unit 110.

Incoming unicast and multicast packets arrive via the egress data link 340 from the switch unit 140, and are received by the DataRx unit 345 via the incoming data link 340. It is the DataRx unit 345 which performs the reception of packets, and directs the received packets to the OPQ 360 queue depending on the packet type (unicast or multicast) and unicast 355 or multicast 350 QoS priority. The implementation of the switch unit 140 and the associated DataRx unit 345 in the output unit 170 for performing fabric scheduling is outside the scope of this invention, and may be performed by conventional fabric scheduling techniques.

The output unit 170 implements an OPQ (output port queue) queue 360 for each unicast and multicast QoS priority defined for the output port. A credit counter variable, MulticastCreditCnt 370, is maintained per OPQ 360 associated with a multicast QoS priority. This variable maintains the associated multicast OPQ's current number of credits, and the variable is defined the range given by:

MulticastCreditCnt $\in$ [–MTU to CreditMax]

Where,
MTU is the largest packet size supported by the switching apparatus
CreditMax is a threshold at which the UnicastCreditCnt counter saturates. A typical value of CreditMax is a value equal to MTU.
The credit counter is updated such that,
MulticastCreditCnt=MulticastCreditCnt+CreditMsg–PacketSize, and has a default reset value of zero.
Where,
CreditMsg is the credit value carried in a multicast credit message which has been received 330 from the output port scheduler 320, and the addition to MulticastCreditCnt is performed when the multicast credit message is received from the egress port scheduler.
PacketSize is the size of a multicast packet which is moved from the OPQ 360 to the Output Port Transmit (OPT) unit 380. The subtraction from MulticastCreditCnt is performed by adder/subtractors when the packet is forwarded from the OPQ 360 to the OPT unit 380.

A MulticastHungry status (Boolean) is associated with each OPQ 360 defined per multicast QoS priority for the output port. The MulticastHungry status determines whether or not the OPQ 360 is eligible to be allocated and receive credits from the output port scheduler unit 320. The MulticastHungry status is made available to the output port scheduler unit 320 which is implemented in the same output unit. The MulticastHungry status is defined as:

MulticastHungry=((NonEmpty) or (MulticastCreditCnt<0)) and (MulticastCreditCnt<CreditMax)
Where,
NonEmpty is a Boolean which is True (="1"), when one or more packets are stored in the associated multicast OPQ 360.
MulticastCreditCnt is the credit counter associated with the OPQ 360 (see definition above)
CreditMax is defined above.

The OPT unit 380 continuously performs a packet arbitration and transmission function algorithm, such as described in the following steps:
1. Wait until one or more of the OPQs 360 buffer a packet, i.e., until one or more of the OPQs 360 can be considered as non-empty according to the following definition of non-empty OPQ queue state.
   a. An OPQ 360 which corresponds to a unicast QoS priority is non-empty when it holds one or more packets. If not, it is considered empty.
   b. An OPQ 360 which corresponds to a multicast QoS priority is considered non-empty when it holds one or more packets and the corresponding MulticastCreditCnt variable is greater than or equal to zero (MulticastCreditCnt 20).
2. Select between non-empty OPQ 360 in the following priority order: unicast QoS priority 1 OPQ, multicast QoS priority 2 OPQ, unicast QoS priority 3 OPQ, multicast QoS priority 4 OPQ.
3. Forward a packet from the selected non-empty OPQ 360 and transmit the packet across the output port.
4. Go to step 1

In the present invention, both the input units 110 and the output units 170 perform credit based scheduling, whereby the input units 110 are slaved to the output units 170 in the determination of which packets or cells are qualified for transfer across the switch unit 140. The input units 110 are involved in the credit based scheduling by generating unicast queue status messages 230, and counting received credits per input queue, and providing that information to the corresponding output unit 170. In that way, the output units 170 provide the primary control for the credit based scheduling, whereby the input units 110 provide information to the output unit 170 for use in the credit based scheduling.

Figure 4:
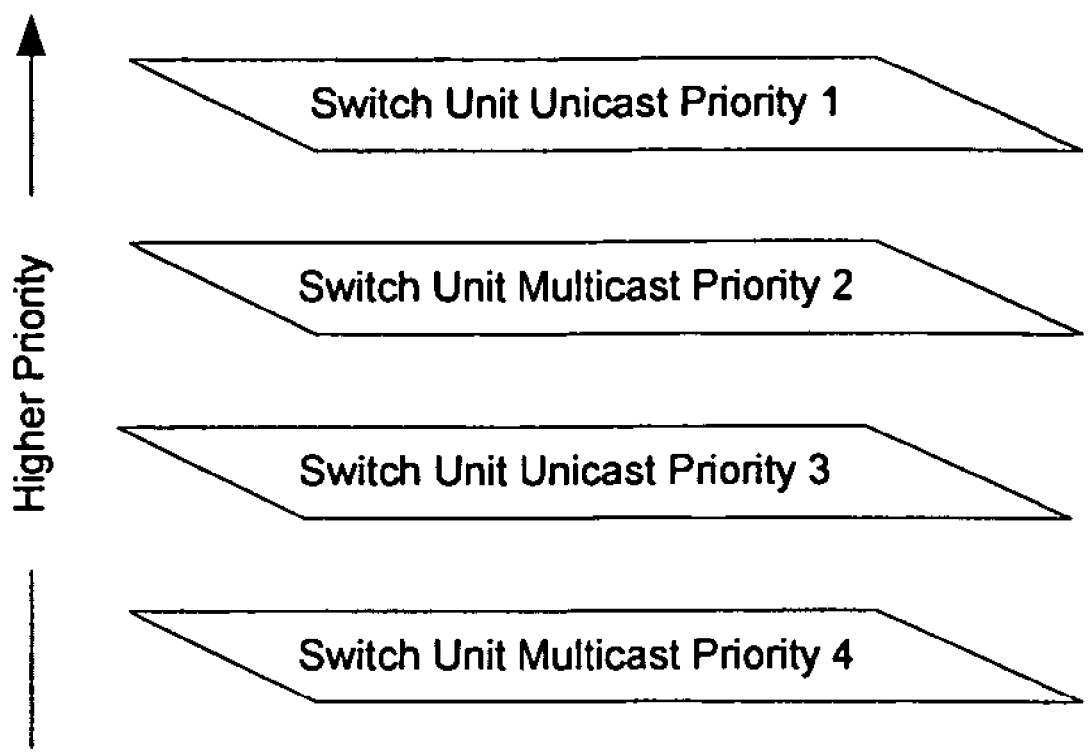
FIG. 4 shows unicast and multicast priorities provided by the switching apparatus according to the first embodiment.

FIG. 4 shows the unicast and multicast QoS priorities provided by the switch apparatus according to the first embodiment. The switch apparatus arbitrates between unicast and multicast traffic using a priority scheme, which is equivalent to the OPQ arbitration performed by the OPT unit 380. In one possible implementation of a priority scheme, the $1^{st}$ priority is unicast QoS priority 1, the $2^{nd}$ priority is multicast QoS priority 2, the $3^{rd}$ priority is unicast QoS priority 3, and the $4^{th}$ priority is multicast QoS priority 4. The unicast and multicast packet priorities provided by the switch apparatus are therefore identical to the QoS priority arbitration performed between OPQs 360 by the OPT unit 380.

Compared to unicast packets which receive the credits at the ingress queues, the multicast packets receive the credits at the OPQ 360. Otherwise, the scheduling of unicast and multicast packets using a credit based procedure at the traffic scheduling stage is not much different from each other.

The methodology of a first embodiment of the present invention has now been described above. The following will describe different options and approaches for implementing the present invention.

The output unit implementation shown in FIG. 3 shows a single output port per output unit 170. An alternative implementation provides multiple output ports per output unit 170. In such an implementation, the output port scheduler unit 320 schedules each of the output units output ports fully independently of each other, and the OPQs 360 and the OPT unit 380 are implemented per output port provided by the output unit 170. In such an implementation where the output units 170 implement multiple output ports, the switch unit 140 still only needs to perform arbitration with input and output unit resolution. This allows for scaling the number of ports in the switching apparatus, without affecting the complexity of the switch unit implementation since the granularity of the switching arbitration provided by the switch unit 140 becomes independent of the number of output ports provided per output unit 170.

The above-described implementation provides a total of four (4) QoS priorities per output port. An alternative implementation can implement any integer number N of QoS priorities per output port, and the priority order between unicast and multicast QoS priorities can be arbitrarily defined, as long as the QoS priority arbitration performed by the OPT unit 380 matches the unicast versus multicast packet arbitration performed by the switch apparatus. The number of QoS priorities and associated OPQs provided by the output unit 170 may be larger than the number of QoS priorities. This allows for scaling the number of QoS priorities per output port in the switching apparatus, without affecting the complexity of the switch apparatus implementation since the QoS prioritization granularity of the switching arbitration provided is independent of the number of QoS priorities provided per output unit.

Figure 5:
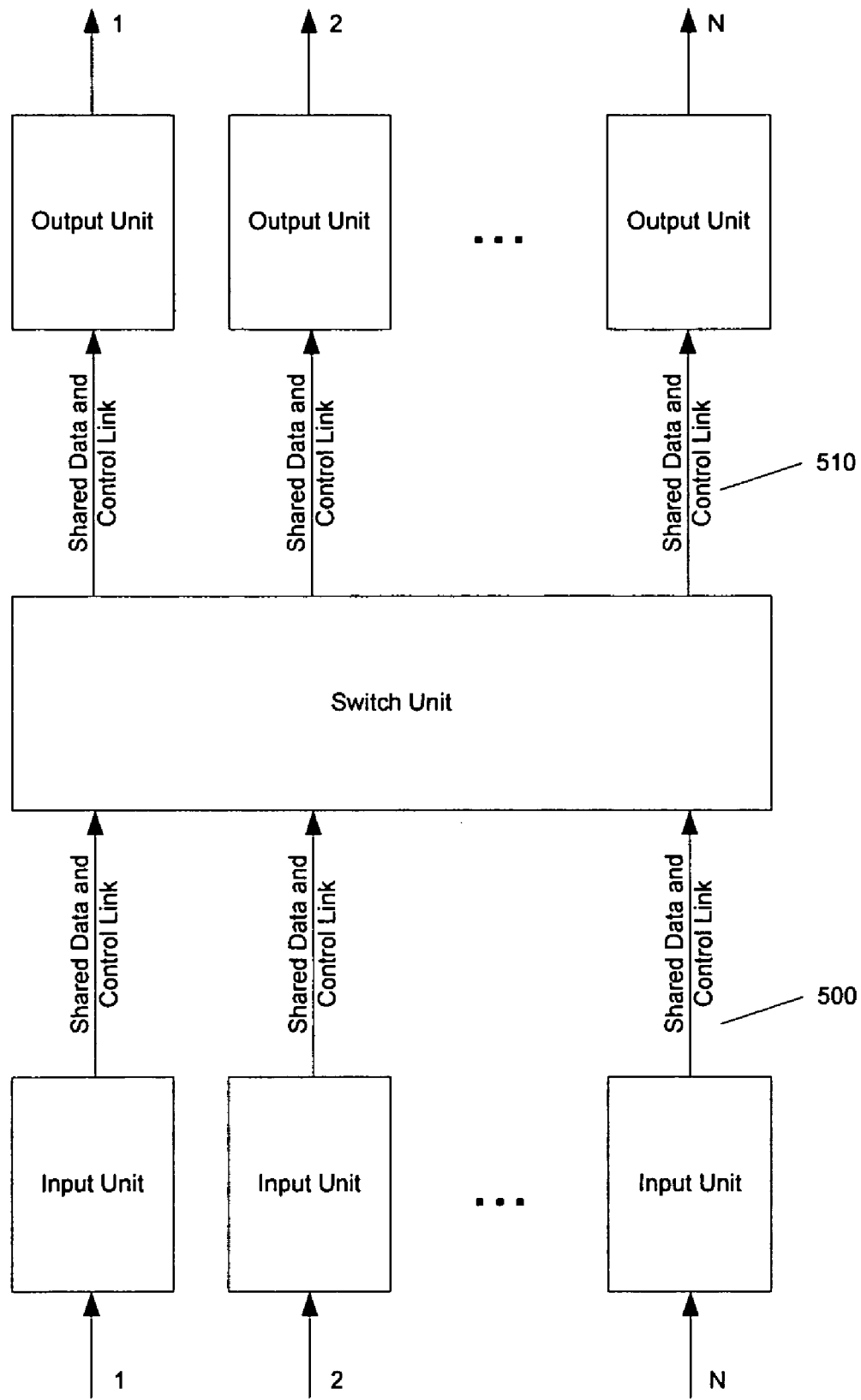
FIG. 5 shows a switching apparatus according to the first embodiment, with combined data and control input/output links.

FIG. 5 shows an alternative implementation of the first embodiment, where the exchange of credit and unicast queue status messages between the input and output units is performed in-band with the switching of packets from input units 110 to output units across the switch unit 140. In-band signifies that credit and unicast queue status messages are transmitted in an interleaved manner (e.g., at predetermined positions for data packets and control information per each link) on the same input and output links, so that the control and data links shown on FIG. 1 can be merged into single combined data/control input 500 or output link 510.

The input and output link shown in FIG. 1 and FIG. 5 can be implemented using one or multiple serial link transmission connections.

The description of the first embodiment has referred to packets, which is a variable size data unit. The present invention also applies to a subset of fixed size packets, which is referred to as a cell unit in the field of networking switching apparatus.

Thus, apparatuses and methods have been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention. Further, one or more aspects as described can be combined in any given system or method. Still further, one or more embodiments may be implemented in hardware, e.g., by a schematic design or a hardware description language (HDL), and/or implemented in a programmable logic device (FPGA/CPLD) or an ASIC, and/or they can be implemented in hardware using discrete hardware devices.

What is claimed is:

1. A switching apparatus, comprising:
a plurality of input units to receive packets to be transferred by the switching apparatus;
N output units to transmit packets out of the switching apparatus, where N is greater than one; and
a switch coupled between the input units and output units, wherein each input unit comprises:
N×M unicast input queues, where M is a number of unicast QoS levels, M equal to one or more, wherein each unicast input queue is associated with one of the N output units and one of the M unicast QoS levels and dedicated to temporarily hold at least one unicast packet having the associated QoS level and destined for the associated output unit,
N×M unicast credit counters, each unicast credit counter maintaining a current unicast credit value for a corresponding unicast input queue, wherein each unicast input queue is qualified to send a packet to the switch when the corresponding current unicast credit value is greater than or equal to a first predetermined value, and
one or more multicast input queues, each multicast input queue associated with a respective one of one or more multicast QoS levels and configured to temporarily hold at least one multicast packets having the associated QoS level;
wherein each output unit comprises:
a plurality of output queues to receive packets from the switch, the plurality of output queues including at least one unicast output queue and at least one multicast output queue, each multicast output queue associated with a respective one of the one or more multicast QoS levels,
a multicast credit counter corresponding to each multicast output queue, each multicast credit counter maintaining a current multicast credit value for the corresponding multicast output queue, wherein each multicast output queue is qualified to output a packet when the corresponding multicast credit value is greater than or equal to a second predetermined value, and
an output port scheduler configured to output packets from the at least one unicast output queue and the at least multicast output queue, if qualified, in accordance with predetermined priorities assigned to the plurality of QoS levels, and to generate credit tokens and to output credit messages based on the credit tokens generated;
wherein:
the switch transfers packets from multicast input queues and qualified unicast input queues of the input units to multicast output queues and unicast output queues of the output units, the switch scheduling transfers in accordance with the predetermined priorities assigned to the plurality of unicast and multicast QoS levels,
each current unicast credit value is updated when a packet is transferred out of the respective unicast input queue by subtracting an amount corresponding to a size of the packet transferred out of the respective unicast input queue from a previous unicast credit value for the respective unicast input queue,
each current unicast credit value is updated when a credit message is received for the respective unicast input queue by adding an amount contained in the credit message to the previous unicast credit value for the respective unicast input queue,
each current multicast credit value is updated when a packet is transferred out of the respective multicast output queue by subtracting an amount corresponding to a size of the packet transferred out of the respective multicast output queue from a previous unicast credit value for the respective multicast output queue,
each current multicast credit value is updated when a credit message is received for the respective multicast output queue by adding an amount contained in the credit message to the previous multicast credit value for the respective multicast output queue,
each input unit determines a Unicast Hungry status for each of the N×M unicast input queues, the Unicast Hungry status set to a first value to indicate that the respective unicast input queue is currently eligible to receive credit messages and set to a second value to indicate that the respective unicast input queue is currently not eligible to receive credit messages, and when the Unicast Hungry status changes for any unicast input queue, the respective input unit outputs a unicast queue status message to the respective output unit indicating the change in status.

2. The switching apparatus according to claim 1, wherein the Unicast Hungry status is set to the first value when the respective unicast input queue is non-empty and the current unicast credit value for the respective unicast input queue is less than a predetermined maximum value or when the current unicast credit value for the respective unicast input queue is less than the first predetermined value.

3. The switching apparatus according to claim 1, wherein each output unit determines a Multicast Hungry status for each for each multicast output queue, the Multicast Hungry status set to a first value of 0 or 1 to indicate that the respective multicast output queue is currently eligible to receive credit messages, and the Multicast Hungry status set to a second value of 1 or 0 different from the first value to indicate that the respective multicast output queue is not currently eligible to receive credit messages.

4. The switching apparatus according to claim 3, wherein the Multicast Hungry status is set to the first value when the respective multicast output queue is non-empty and the current multicast credit value for the respective multicast output queue is less than a predetermined maximum value, or when the current multicast credit value for the respective multicast output queue is less than the second predetermined value.

5. The switching apparatus according to claim 3, wherein each output port scheduler determines a destination for each credit message based on unicast queue status messages received from input units, the Multicast Hungry status of the one or more multicast output queue within the respective output unit, and a predetermined priority scheme between unicast and multicast QoS levels.

6. The switching apparatus according to claim 5, wherein the transfer of packets from the input units to the output units through the switch is interleaved with the transfer of unicast queue status messages and credit messages.

7. A method for switching packets, comprising:
receiving packets in a plurality of input units;
transferring the received packets from the input units through a switch to one or more N output units, where N is greater than one; and
outputting transferred packets from the output units,
wherein receiving packets in the plurality of input units further comprises:
  temporarily storing each received unicast packet in one of N×M unicast input queues within each input unit, where M is a number of unicast QoS levels, each input queue associated with a respective one of the output units and a respective one of the unicast QoS levels, wherein each received unicast packet is stored in a unicast input queue associated with an output unit that is a destination of the received packet and with a QoS level of the received packet,
  temporarily storing each received multicast packet in one of one or more multicast input queues associated respectively with one or more multicast QoS levels, each received multicast packet is stored in a multicast input queue associated with the QoS level of the received packet, and
maintaining a current unicast credit value for each unicast input queue, wherein each unicast input queue is qualified to send a packet to the switch when the corresponding current unicast credit value is greater than or equal to a first predetermined value, wherein maintaining a current unicast credit value further comprises:
  updating each current unicast credit value when a packet is transferred out of the respective unicast input queue by subtracting an amount corresponding to a size of the packet transferred out of the respective unicast input queue from a previous unicast credit value for the respective unicast input queue,
  updating each current unicast credit value when a credit message is received for the respective unicast input queue by adding an amount contained in the credit message to the previous unicast credit value for the respective unicast input queue,
  determining a Unicast Hungry status for each of the N×M unicast input queues, the Unicast Hungry status set to a first value to indicate that the respective unicast input queue is currently eligible to receive credit messages and set to a second value to indicate that the respective unicast input queue is currently not eligible to receive credit messages, and
  when the Unicast Hungry status changes for any unicast input queue, the respective input unit sending a unicast queue status message to the respective output unit indicating the change in status;
wherein transferring the received packets through the switch further comprises:
  transferring packets from multicast input queues and qualified unicast input queues of the input units to the output units, and
  scheduling transfers in accordance with the predetermined priorities assigned to the plurality of unicast and multicast QoS levels; and
wherein outputting transferred packets from the output units further comprises:
  receiving packets from the switch in at least one of a plurality of output queues, the plurality of output queues including at least one unicast output queue and at least one multicast output queue within each output unit, each output queue associated with a respective one of the plurality of QoS levels,
  maintaining a current multicast credit value for each multicast output queue, wherein each multicast output queue is qualified to output a packet when the corresponding multicast credit value is greater than or equal to a second predetermined value, wherein maintaining a current multicast credit value further comprises:
    updating each current multicast credit value when a packet is transferred out of the respective multicast output queue by subtracting an amount corresponding to a size of the packet transferred out of the respective multicast output queue from a previous unicast credit value for the respective multicast output queue, and
    updating each current multicast credit value when a credit message is received for the respective multicast output queue by adding an amount contained in the credit message to the previous multicast credit value for the respective multicast output queue;

outputting packets from the at least one unicast output queue and the at least multicast output queue, if qualified, in accordance with predetermined priorities assigned to the plurality of QoS levels, and generating credit tokens and sending credit messages based on the credit tokens generated.

8. The method for switching packets according to claim 7, wherein the Unicast Hungry status is set to the first value when the respective unicast input queue is non-empty and the current unicast credit value for the respective unicast input queue is less than a predetermined maximum value or when the current unicast credit value for the respective unicast input queue is less than the first predetermined value.

9. The method for switching packets according to claim 7, further comprising:

each output unit determining a Multicast Hungry status for each multicast output queue, the Multicast Hungry status set to a first value of 0 or 1 to indicate that the respective multicast output queue is currently eligible to receive credit messages, and the Multicast Hungry status set to a second value of 1 or 0 different from the first value to indicate that the respective multicast output queue is not currently eligible to receive credit messages.

10. The method for switching packets according to claim 9, wherein the Multicast Hungry status is set to the first value when the respective multicast output queue is non-empty and the current multicast credit value for the respective multicast output queue is less than a predetermined maximum value, or when the current multicast credit value for the respective multicast output queue is less than the second predetermined value.

11. The method for switching packets according to claim 9, further comprising:

each output port scheduler determining a destination for each credit message based on unicast queue status messages received from input units, the Multicast Hungry status of the one or more multicast output queue within the respective output unit, and a predetermined priority scheme between unicast and multicast QoS levels.

12. The method for switching packets according to claim 11, wherein transferring packets from the input units to the output units through the switch is interleaved with the transfer of unicast queue status messages and credit messages.

* * * * *